(12) United States Patent
Takami et al.

(10) Patent No.: US 6,422,004 B1
(45) Date of Patent: Jul. 23, 2002

(54) SYSTEM FOR CONTROLLING ENGINE

(75) Inventors: Akihide Takami; Tomomi Watanabe; Tomoaki Saito; Terunori Kondou, all of Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/638,968

(22) Filed: Aug. 15, 2000

(30) Foreign Application Priority Data

Sep. 22, 1999 (JP) .......................................... 11-268499

(51) Int. Cl.[7] ............................................... F01N 3/00
(52) U.S. Cl. ............................. 60/285; 60/286; 60/295; 60/301; 60/303
(58) Field of Search ........................ 60/285, 286, 297, 60/295, 303, 299, 301

(56) References Cited

U.S. PATENT DOCUMENTS

| | | | | |
|---|---|---|---|---|
| 5,207,058 A | * | 5/1993 | Sasaki et al. | 60/284 |
| 5,479,775 A | * | 1/1996 | Kraemer et al. | 60/274 |
| 5,483,795 A | * | 1/1996 | Katoh et al. | 60/276 |
| 5,642,705 A | * | 7/1997 | Morikawa et al. | 60/285 |
| 5,839,275 A | * | 11/1998 | Hirota et al. | 60/285 |
| 5,975,046 A | * | 11/1999 | Kaneko et al. | 60/285 |
| 6,041,591 A | * | 3/2000 | Kaneko et al. | 60/285 |
| 6,173,571 B1 | * | 1/2001 | Kaneko et al. | 60/286 |
| 6,293,095 B1 | * | 9/2001 | Yamamoto et al. | 60/284 |

FOREIGN PATENT DOCUMENTS

| | | |
|---|---|---|
| JP | 8-200045 | 8/1996 |
| JP | 10-252543 | 9/1998 |

* cited by examiner

*Primary Examiner*—Thomas Denion
*Assistant Examiner*—Diem Tran
(74) *Attorney, Agent, or Firm*—Brooks & Kushman, P.C.

(57) ABSTRACT

An engine control system causes a NOx trapping substance to release absorbed NOx by increasing an amount of fuel and spraying the fuel through primary fuel injection which is made at a primary fuel injection timing near a dead top center of a compression stroke and post-fuel injection which is made at a post-fuel injection timing between an expansion stroke and an exhaust stoke after said primary fuel injection with a retardation which is large at the beginning of implementation of the post-fuel injection and, thereafter changed small.

5 Claims, 11 Drawing Sheets

SYSTEM FOR CONTROLLING ENGINE

BACKGROUND OF THE INVENTION

1. Field of the Invention

The present invention relates to system for controlling an engine equipped with a fuel injector through which fuel in injected directly into an engine.

2. Description of the Related Art

Typically, three-way catalysts are known as a catalytic operative to simultaneously and quite effectively lowers emission levels of HC, CO and NOx in exhaust gas from an internal combustion engine so as thereby to purify the exhaust gas at an approximately stoichiometric air-to-fuel ratio. However, a diesel engine is operated with an air-to-fuel ratio in an extremely lean state (for example, A/F≧18), so the three-way catalyst can not reduce NOx in exhaust gas. Furthermore, when the air-to-fuel ratio is in the extremely lean state, the oxygen concentration of exhaust gas becomes extremely high, so that it is difficult to reduce NOx sufficiently in such an atmosphere even through a NOx purifying catalyst. In this regards, the same thing can be said of a gasoline engine with air-to-fuel ratios in a lean range. To the contrary, there has been known a technology in which utilization is made of a so-called NOx trapping substance that absorbs NOx in an excess oxygen exhaust gas with an oxygen concentration higher than a predetermined oxygen concentration of, for example, 4%, and releases the absorbed NOx as the oxygen concentration drops. However, it is necessary for the NOx trapping substance to carry out so-called refreshing that is referred to releasing the absorbed NOx before the absorption capacity declines, since the NOx trapping substance encounters a decline in absorption capacity with an increase in the amount of NOx absorption.

A fuel injection system such as disclosed in, for example, Japanese Unexamined Patent Publication No. 6-200045, performs primary fuel injection ordinarily at a point of time near a top dead center of a compression stroke and, however, performs post fuel injection at a point of time between an expansion and an exhaust stroke in addition to the primary fuel injection at the point of time near a top dead center of a compression stroke so as thereby to enrich an exhaust gas or decreasing an air-to-fuel ratio of the exhaust gas (which is referred to as an exhaust gas air-to-fuel ratio) in order to release NOx from the NOx trapping substance disposed in an exhaust passage. NOx released from the NOx trapping substance reacts to HC and/or CO in the exhaust gas to be deoxidized. The fuel injection control means further discloses that, in order to prevent a large amount of unburned fuel from being admitted into an intake air stream, an exhaust gas recirculation passage is shut off when the fuel injection control for refreshing the NOx trapping substance in an engine operating region of moderate and lower engine loads where an increase in the amount of exhaust gas is required.

Japanese Unexamined Patent Publication No. 10-252543 discloses improving the NOx conversion efficiency of a NOx deoxidization catalyst disposed in an exhaust passage by changing a post-fuel injection timing so as to reform highly fuel that is sprayed through post-fuel injection according to in-cylinder temperatures that are estimated on the basis of a temperature of then exhaust gas.

When the post-fuel injection is implemented, a large amount of NOx is released abruptly at the beginning of a change in exhaust gas air-to-fuel ratio from a lean state to a rich state (including an exhaust gas air-to-fuel ratio represented by an excess air ratio (λ) of approximately 1 (one), so that there occurs a lack of HC for NOx deoxidization, as a result of which the NOx trapping substance encounters aggravation of NOx conversion efficiency. In order to provide an amount of HC sufficient to deoxidize the temporarily increased amount of NOx released from the NOx trapping substance, though it can be acceptable to increase the amount of post-fuel injection so as to provide highly reformed fuel by advancing a post-fuel injection timing, nevertheless, it causes aggravation of fuel consumption.

Diesel engines are operated with significantly low air-to-fuel ratios and, in consequence, and, in consequence, often generate exhaust gases at low temperatures below than 200° C. When the exhaust gas is at a low temperature like this, even though the post-fuel injection is implemented to raise the air-to-fuel ratio so as thereby to produce an atmosphere suitable for the NOx deoxidization catalyst to deoxidize NOx or to cause the NOx trapping substance to release NOx, it is difficult to deoxidize NOx and purify the exhaust gas because of low activity of the catalyst itself. When the NOx trapping substance is at lower temperatures, it is hard to release NOx as expected even when an exhaust gas air-to-fuel ratio is raised. Further, though an exhaust gas temperature raises due to an advance in post-fuel injection timing, nevertheless, the fuel sprayed through the post-fuel injection becomes apt to burn in the cylinder, so as to cause a less increase in the amount of HC in the exhaust gag. In this regard, it is unfavorable for the NOx trapping substance to advance the post-fuel injection timing.

SUMMARY OF THE INVENTION

It is an object of the present invention to provide a control system for controlling an engine which prevents aggravation of NOx conversion efficiency of an NOx trapping substance at the beginning of a change in exhaust gas air-to-fuel ratio from a lean state to a rich state due to post-fuel injection that is implemented to release NOx from a NOx trapping substance.

It is another object of the present invention to provide a control system for controlling an engine which activates early a catalyst while post-fuel injection is implemented.

The foregoing objects of the present invention have been accomplished by an engine control system devised on the basis of the fact, which has been revealed by the inventors of the present application, that a relatively large increase in the amount of HC is caused in an exhaust gas by changing a post-fuel injection timing without increasing the amount of post-fuel injection, According to an aspect of the present invention, a control system for an engine equipped with a fuel injector through which fuel is sprayed directly into a combustion chamber of the engine and a catalyst containing a NOx trapping substance which is operative to absorb NOx in an excess oxygen exhaust gas and release NOx into the exhaust gas when there is a drop in oxygen concentration and, as a result of which, a reaction of HC to NOx released from the NOx trapping substance so as thereby to purify the exhaust gas, comprises fuel injection control means for performing fuel injection through primary fuel injection which is made at a primary fuel injection timing near a dead top center of a compression stroke and post-fuel injection which is made at a post-fuel injection timing between an expansion stroke and an exhaust stroke after the primary fuel injection when causing a drop in oxygen concentration so as to release NOx from the NOx trapping substance, wherein the control means controls a retardation of the post-fuel injection timing so as to be large for a specified period of time from commencement of the post-fuel injection and to be small after a lapse of the specified period of time.

The term "excess oxygen atmosphere" or "excess oxygen exhaust gas" as used herein shall mean and refer to atmosphere or exhaust gas in a state where oxygen exists sufficiently around a NOx trapping substance so much as to cause the NOx trapping substance to absorb NOx in an exhaust gas and prevent the NOx trapping substance from releasing NOx into the exhaust gas. Specifically, the excess oxygen atmosphere or excess oxygen exhaust gas has an oxygen concentration higher than a specific value of, for example, 4% and an exhaust gas air-to-fuel ratio is higher than a stoichiometric air-to-fuel ratio, for example equal to or greater than 18. The exhaust gas air-to-fuel ratio is consistent with an air-to-fuel ratio of an air-fuel mixture in a combustion chamber (which is referred to as a combustion chamber air-to-fuel ratio and shall mean a mean air-fuel ratio of an air-fuel mixture in a combustion chamber) in the case where fuel and/or secondary air are not supplied directly into the exhaust passage. Further, a drop in oxygen concentration may be to a value greater than 3% but less than 4%, more desirably greater than 1% but less than 2%. For example, attainment of a rich state where an exhaust gas air-to-fuel ratio reaches a stoichiometric air-to-fuel ratio or a value near the stoichiometric air-to-fuel ratio fulfills this "drop in oxygen concentration".

With the engine control system thus constructed, while an exhaust gas is in a lean state, NOx in the exhaust gas is absorbed by the NOx trapping substance and prevented from being emitted into the atmosphere. When the NOx should be released from the NOx trapping substance, the amount of intake air or fuel injection admitted into the engine is controlled to change a combustion chamber air-to-fuel ratio toward a rich side so as thereby to cause a drop in oxygen concentration of exhaust gas around the NOx trapping substance and, concurrently, fuel injection is implemented through primary fuel injection which is made at a point of time near a top dead center of a compression stroke and post-fuel injection which is made at a point of time in an expansion and an exhaust stroke after implementation of the primary fuel injection. A change in mean combustion chamber air-to-fuel ratio causes restraint of NOx generation and a drop in oxygen concentration of exhaust gas as well. Furthermore, implementation of the post-fuel injection produces an increased amounts of HC (unburned HC and partly deoxidized and reformed HC) and CO, oxygen in the exhaust gas is consumed for deoxidization of HC and CO on the catalyst. As a result, the oxygen concentration around the NOx trapping substance drops, NOx that is absorbed in the form of $NO_3^-$ in the NOx trapping substance is released in the form of $NO_2$. Since the release of NOx occurs relatively rapidly due to commencement of the post-fuel injection, a NOx concentration raises sharply around the NOx trapping substance. To the contrary, with the engine control system of the present invention, since a retardation of post-fuel injection timing from a top dead center of a compression stroke is made large for a period of time from commencement of the post-fuel injection, the large retardation restraints combustion of the fuel sprayed through the post-fuel injection an effect of causing an increase in HC generation as compared with a small retardation. Accordingly, although NOx is released abruptly, a deoxidization material, i.e. HC, necessary to deoxidize NOx is prevented from being in short supply. Further, though the amount of NOx that is released from the NOx trapping substance decreases sharply with a lapse of time, since the retardation of post-fuel injection timing is changed smaller after a lapse of a specified period of time, the control prevents an exhaust gas from raising an level of HC in excess therein and emitting the HC into the atmosphere as it is.

The retardation of post-fuel injection timing that is made for the specified period of time is desirable to be greater than 30° in crank angle but less than 50° in crank angle (before an early half of an expansion stroke). This is because a retardation of post-fuel injection timing greater than 30° in crank angle from a top dead center of a compression stroke yields an effect of significantly increasing the amount of HC in the exhaust gas, and an excessive retardation of post-fuel injection timing causes a drop in in-cylinder temperature, and hence exhaust gas temperature, which leads to aggravation of engine combustibility, aggravation of releasing performance of the NOx trapping substance and poor deoxidization of NOx.

The post-fuel injection timing after a lapse of the specified period of time may be set so as to bring a concentration ratio of a CO concentration relative to a HC concentration of an exhaust gas becomes greater than a specified value. This is because, when CO concentrates around the NOx trapping substance due to an increase in the amount of CO generation, NOx in the NOx trapping substance becomes apt to secede from the NOx trapping substance due to replacement with CO (at this time the NOx trapping substance is transformed into a form of carbonate). In consequence, refreshing the NOx trapping substance is achieved quickly, so that the period of time for which the post-fuel injection is made is shortened with an effect of preventing or significantly reducing aggravation of fuel consumption.

In the case where the is equipped with an exhaust gas recirculation system for admitting partly an exhaust gas into an intake air stream, the post-fuel injection timing after a lapse of the specified period of time from commencement of the post-fuel injection may be set so as to lower a HC concentration of the exhaust gas while the exhaust gas is recirculated. As described above, it is effective to increase an HC concentration of an exhaust gas by implementing the post-fuel injection in order to cause the NOx trapping substance to release NOx and purify the exhaust gas, which, however, results in supply of an increased amount of unburned fuel into an intake air stream while the exhaust gas is recirculated, so as to cause aggravation of fuel consumption. In particular, in the case where the amount of exhaust gas recirculation is increased as measures to prevent smoke generation when a mean combustion chamber air-to-fuel ratio changes onto a rich side due to implementation of the post-fuel injection, it is a problem that a large amount of unburned HC is admitted into an intake air stream. Therefore, in the engine control system of the present invention, since the NOx trapping substance requires a less amount of HC after a progress of releasing NOx from the NOx trapping substance, the retardation of post-fuel injection timing is changed smaller so as to cause a decrease in the amount of HC generation in the exhaust gas, thereby preventing unburned HC from being admitted into the intake air stream. In this case, the retardation may be less than 20° in crank angle from a dead center from a compression stroke.

Though it is desirably to utilize barium as the NOx trapping substance, utilization may be made of one selected from a group of other alkaline earth metals, alkaline metals and rear earth metals or a combination of two selected from the group. The NO trapping substance may be used in combination with NOx purifying catalyst or supported together with a NOx purifying catalytic metal on a catalyst substrate. Otherwise, the NOx trapping substrate and a NOx purifying catalytic metal may be layered on a honeycomb substrate and disposed in an exhaust passage such that the NOx trapping substance layer is upstream from the NOx purifying metal layer with respect to an exhaust gas stream. It is also acceptable to use the NOx trapping substance in combination with a three-way catalyst. The NOx purifying catalyst may be of a type supporting a noble metal such as platinum or a transition metal on zeolite or the like.

According to another aspect of the present invention, the control system for an engine equipped with a fuel injector through which fuel is sprayed directly into a combustion chamber of the engine and a catalyst disposed in an exhaust passage and operative to oxidize HC performs fuel injection control in which primary fuel injection is made at a primary fuel injection timing near a dead top center of a compression stroke and post-fuel injection is made at a post-fuel injection timing between an expansion stroke and an exhaust stroke after implementation of the primary fuel injection. The fuel injection control system comprises temperature detection means for detecting a temperature of the catalyst, and control means for making a retardation of the post-fuel injection timing large for a specified period of time from commencement of the post-fuel injection and, on the other hand, making it small after a lapse of the specified period of time when the temperature of the catalyst is lower than a specified temperature.

With the engine control system, in conditions where an exhaust gas is at low temperatures, though the catalyst is low in activity and, in consequence, performs less sufficient purification of the exhaust gas, there is provided an increase in the amount of HC in the exhaust gas by implementing the post-fuel injection at a timing temporarily retarded greatly, so that an oxidizing reaction of HC becomes apt to progress and, in consequence, activation of the catalyst is promoted due to a raise in catalyst temperature which is caused by reaction heat. Since catalyzing reaction progresses well with a high efficiency after the catalyst has gained sufficient activity once, the catalyst activity is kept even when the retardation of post-fuel injection timing is made small, so as to purify the exhaust gas efficiently. Further, making the retardation of post-fuel injection timing small improves combustibility of the fuel sprayed through the post-fuel injection with an effect of preventing aggravation of an emission level of NOx due to a state where an excess of HC continues.

Utilization may be made of a NOx purifying catalyst as the catalyst which is effective in deoxidizing HC. In this case, the catalyst is improved in NOx purification efficiency and, when used in combination with a NOx trapping substance, purifies efficiently NOx that is released from the NOx trapping substance.

As described above, the engine control system which performs the primary fuel injection which is made at a point of time near a top dead center of a compression stroke and the post-fuel injection at a point of time after the primary fuel injection when causing the NOx trapping substance to release NOx and makes a retardation of post-fuel injection timing from the top dead center of a compression stroke for a specified period of time from commencement of the post fuel injection large and, however, small after a lapse of the specified period of time, enables it to supply a large amount of HC around the NOx trapping substance when causing the NOx trapping substance to release NOx quickly with an effect of preventing an occurrence of a lack of HC for deoxidization pf the NOx that is released from the NOx trapping substance, which is always advantageous for improvement of NOx conversion efficiency. Moreover, supply of a large amount of HC causes instantaneously a raise in temperature of a noble metal of the catalyst, as a result of which the catalyst enhances improvement of NOx conversion efficiency.

Further, the engine control system, when implementing the primary fuel injection which is made at a point of time near a top dead center of a compression stroke and the post-fuel injection at a point of time between an expansion and an exhaust stroke after implementation of the primary fuel injection, makes a retardation of post-fuel injection timing from the top dead center of a compression stroke for a specified period of time from commencement of the post fuel injection large and, however, small after a lapse of the specified period of time, while the catalyst is at temperatures lower than a specified value. Accordingly, it is enabled to activate the catalyst quickly by temporarily supply a large amount of HC to the catalyst, as a result of which catalytic conversion efficiency of the catalyst is improved even at lower exhaust gas temperatures.

BRIEF DESCRIPTION OF THE DRAWINGS

The above and other objects and features of the present invention will be clearly understood from the following description with respect to the preferred embodiment thereof when considered in conjunction with the accompanying drawings, in which.

DETAILED DESCRIPTION OF THE PREFERRED EMBODIMENTS

Figure 1:
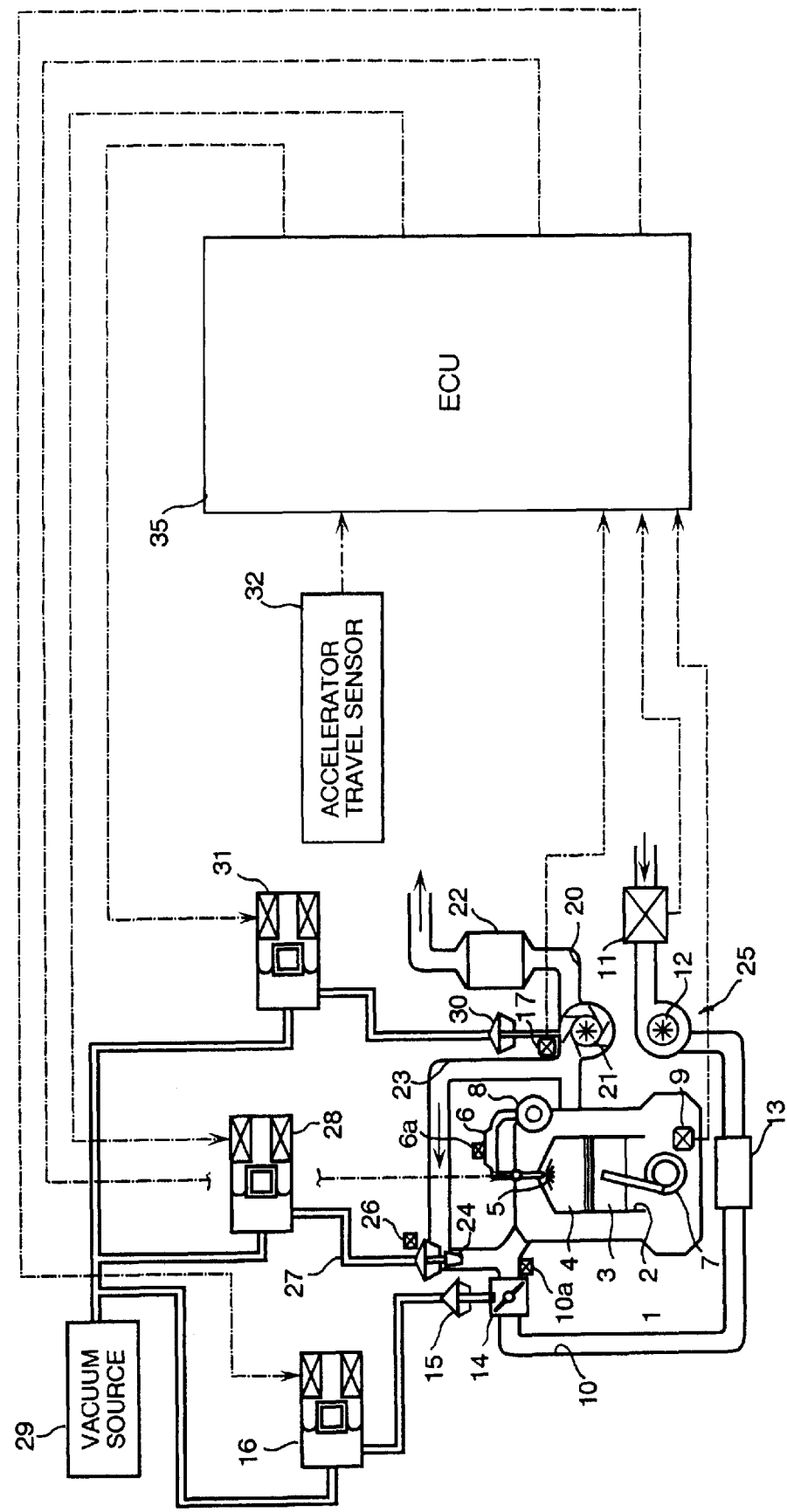
FIG. 1 is an illustration showing the overall structure of a diesel engine control system in accordance with a preferred embodiment of the invention.

Referring to the drawings in detail, and in particular, to FIG. 1 which shows the overall structure of an exhaust gas purifying system for a diesel engine according to a preferred embodiment of the invention, denoted by a reference numeral 1 is a multiple cylinder diesel engine carried in a vehicle. The diesel engine 1 has multiple cylinders 2 (only one of which is shown in the figure), in which pistons 3 are received to slide. A combustion chamber 4 is formed inside each cylinder 2 by the piston 3. Also, a fuel injector (fuel injection valve) 5 is located at the center of a top of the combustion chamber 4 with its nozzle faced to the combustion chamber 4. The fuel injector 5 is opened and closed at a predetermined fuel injection timing to spray fuel directly into the combustion chamber 4. Each fuel injector 5 mentioned above is connected to a common rail (pressure accumulating chamber) 6 for accumulating high-pressure fuel therein, The common rail 6 is provided with a pressure sensor 6a operative to detect an internal fuel pressure as a common rail pressure and a high-pressure supply pump 8 which is driven by a crank shaft 7 of the diesel engine 1. The high-pressure supply pump 8 holds the fuel pressure at a level higher than a specified pressure of, for example, approximately 20 MPa during idling or 50 MPa during operation other than idling. Also, a crank angle sensor 9, which may take the form of electromagnetic pick-up well known to those in the art, is provided to detect a rotational angle of the crank shaft 8. The crank angle sensor 9 comprises a plate with peripheral projections for detection (not shown) secured to one end of the crank shaft 7 and an electromagnetic pickup (not shown) arranged correspondingly in position to the outer periphery of the plate. The electromagnetic pickup outputs a pulse signal in response to one of the peripheral projections arranged at regular angular intervals. The diesel engine 1 at one of opposite sides (the left side as viewed in the figure) has an intake passage 10 through which intake air is supplied into the combustion chamber 4 of the engine 1 via an air cleaner (not shown). The intake passage 10 at a downstream end is branched off through a surge tank (not shown) and connected respectively to the combustion chambers 4 of the cylinders 2 through intake ports. A charging pressure sensor 10a is provided in order to detect a supercharging pressure in the inside of the surge tank that is supplied to the cylinders 2. The intake passage 10 is further provided, in order from the upstream end to the downstream end, with a hot film type of air flow sensor 11 operative to detect an amount of fresh air which is introduced into the intake passage 10, a blower 12 which is driven by a turbine 21 of a turbocharger 25 to compress intake air, an intercooler 13 operative to cool down the intake air that is compressed by this blower 12, and an intake throttle valve 14 as means operative to reduce the amount of fresh air by reducing an cross section of the intake passage 10. The intake throttle valve 14 is of a type comprising a butterfly valve which has a notch so as to admit intake air even while it is fully closed. Similar to an exhaust gas recirculation (EGR) valve 24 which will be described later, the intake throttle valve 14 is controlled to change its opening by controlling the level of negative pressure acting on a diaphragm 15 by an electromagnetic valve 16 for negative pressure control. Although not shown in the figure, the intake throttle valve 14 is accompanied by a valve lift sensor. Denoted by a reference numeral 20 is an exhaust passage 20 into which exhaust gas is discharged from the combustion chamber 4 of each cylinder 2. The exhaust passage 20 at the upstream end is branched off and connected to the combustion chambers 4 of the cylinders 2 through exhaust ports and provided, in order from the upstream end to the downstream end, with an oxygen ($O_2$) sensor (which is hereafter referred to as an $O_2$ sensor) 17 operative to detect the oxygen concentration of exhaust gas, the turbine 21 which is driven by an exhaust gas flow and a catalyst 22 operative to lower emission levels of HC, CO and NOx and particulate in exhaust gas so as thereby to purify the exhaust gas.

The $O_2$ sensor 17, which is used to detect an exhaust gas air-to-fuel ratio based on an oxygen concentration of exhaust gas, has a characteristic wherein an output sharply changes at an approximately stoichiometric air-to-fuel ratio. The catalyst 22 has two catalyst layers formed on the wall surface of a number of pours or holes of a cordierite honeycomb substrate (not shown) which are directed in the same direction of an exhaust gas flow and has a characteristic such as to absorb NOx in exhaust gas with a high oxygen concentration, namely, excess oxygen exhaust gas and release the NOx that have been absorbed in a rich state where exhaust gas has a lower oxygen concentration than the excess oxygen exhaust gas so as thereby to purify the exhaust gas. Specifically, the catalyst 22 comprises an inner catalyst layer, formed on the substrate, which carries platinum (Pt) as a noble metal and barium (Ba) as an NOx trapping substance supported by alumina and ceria and an outer catalyst layer, formed over the inner catalyst layer, which carries platinum (Pt) as a noble metal supported by zeolite. The catalyst 22 is not limited to the above mentioned composition, and can be acceptable as long as containing a catalytic substance that reduces and purifies NOx in exhaust gas in a rich state near a stoichiometraic air-to-fuel ratio or at an air-to-fuel ratio lower than the stoichiometraic air-to-fuel ratio and a NOx trapping substance.

Figure 2A:
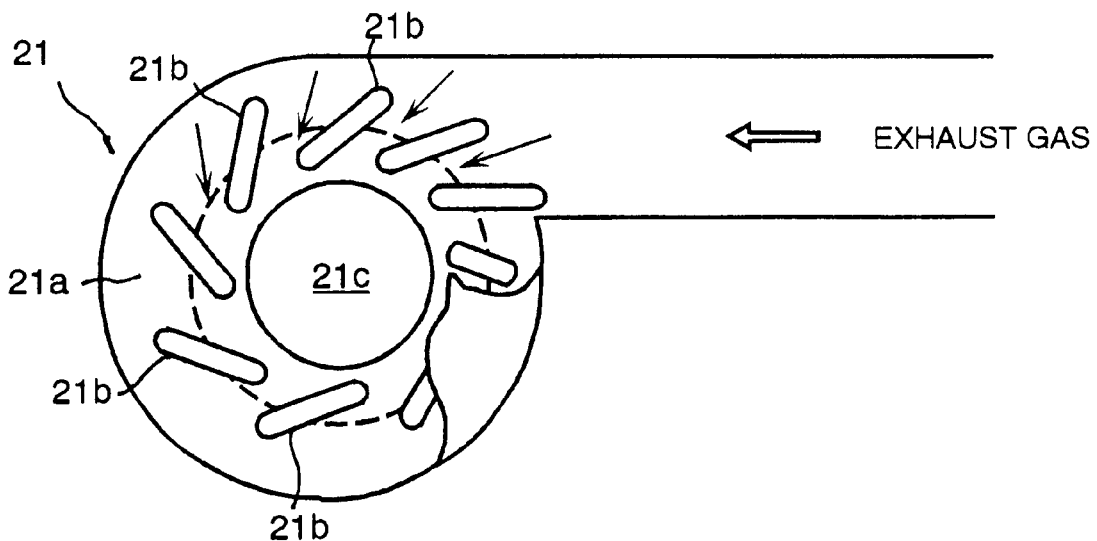
FIG. 2A is an explanatory cross-sectional views showing a turbine of a variable geometric turbocharger in which an A/R ratio is small.
Figure 2B:
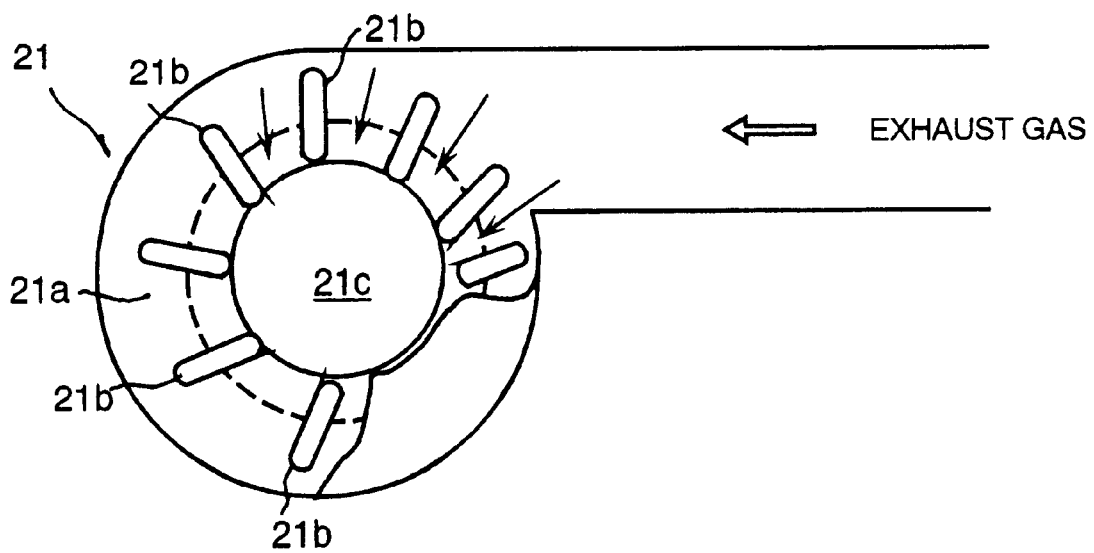
FIG. 2B is an explanatory cross-sectional views showing the turbine of the variable geometric turbocharger in which the A/R ratio is large.

Referring to FIGS. 2A and 2B, the turbocharger 25 is of a variable geometric type and comprises the turbine 21 and the blower 12. The turbine 21 has a number of variable vanes 21b arranged in a turbine chamber 21a so as to surround the entire periphery of the turbine chamber 21a. These variable vane 21b are variable in angle to change a nozzle cross-sectional area (A) through which an exhaust gas stream flows through. In this variable geometric turbocharger 25, as shown in FIG. 3A, the variable vanes 21b are positioned at small angles relative to the circumferential direction of the turbine 21 so as to narrow the nozzle cross-sectional area (A), which causes an increase in supercharging efficiency even in a region of low engine speeds where an exhaust gas flow is small. On the other hand, as shown in FIG. 3B, the variable vanes 21b are directed to the center of the turbine 21 so as to broaden the nozzle cross-sectional area (A) with an effect of increasing supercharging efficiency even in a region of high engine speeds where an exhaust gas flow is large.

Figure 3:
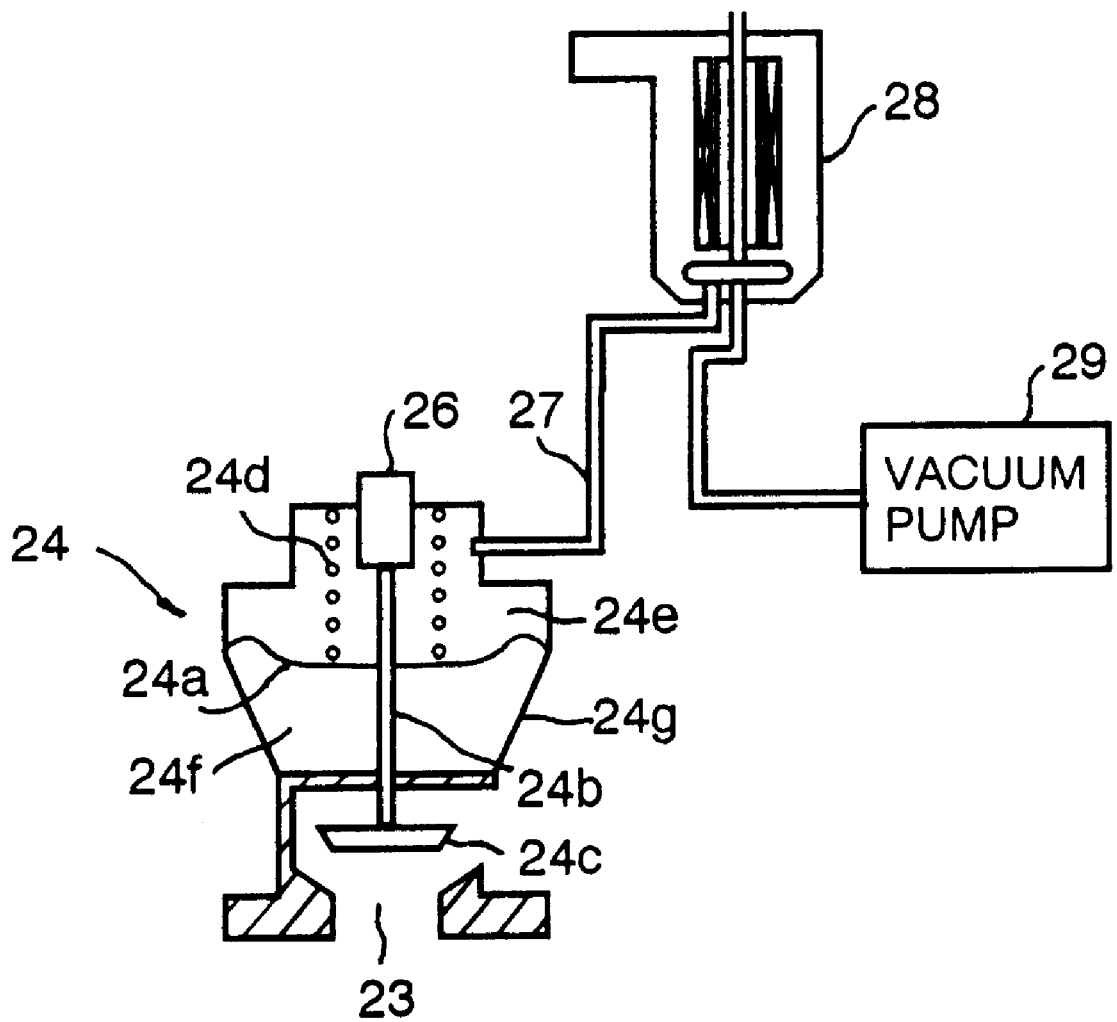
FIG. 3 is an illustration showing the structural of an exhaust gas recirculation valve and its associated drive system.

The exhaust passage 20 at the upstream from the turbine 21 is branched off and connected to an exhaust gas recirculation (EGR) passage 23 through which exhaust gas is partly recirculated into the intake stream. The exhaust gas recirculation passage 23 at the downstream end is connected to the intake passage 10 at a further downstream side relative to the intake throttle valve 14. The exhaust gas recirculation passage 23 at a point close to the downstream end is provided with the exhaust gas recirculation valve 24 which is operated by negative pressure to adjust its opening so as to admit partly exhaust gas from the exhaust passage 20 into the intake passage 10. The exhaust gas recirculation valve 24, as shown in FIG. 3, comprises a valve rod 24b connected to a diaphragm 24a by which a valve box 24g is divided into upper and lower chambers 24e and 24f, and a valve body 24c which adjustably opens or closes the exhaust gas recirculation passage 23 so as to linearly change an area through which exhaust gas flows. The exhaust gas recirculation valve 24 is provided with a lift sensor 26 secured to one end of the valve rod 24b. The valve body 24c is forced by a spring 24d in a closing direction (downward as viewed in FIG. 3). A vacuum passage 27 is connected between a vacuum pump (pressure source) 29 through an electromagnetic valve 28 which controls negative pressure. The negative pressure in the vacuuming chamber 24e, with which the exhaust gas recirculation valve 24 is driven, is controlled by energizing the electromagnetic valve 28 with a control signal (electric current) from an electronic control unit (ECU) 35 which will be described later to open or shut the vacuum passage 27, by means of which the exhaust gas recirculation passage 23 is linearly changed in its opening by the valve body 24c. Similarly to the exhaust gas recirculation valve 24, the turbocharger 25 is provided with a diaphragm 30 in connection with the variable vanes 21b of the turbine 21 such that the variable vanes 21b are controlled in angle relative to the turbine 21 by controlling a negative pressure on the diaphragm 30 by an electromagnetic valve 31 operative to control negative pressure. Although not shown in FIGS. 2A and 2B, the arrangement of vanes 21b is linked to a diaphragm, similar to that of the exhaust gas recirculation valve 24, operative to regulate vane openings according to a negative pressure applied thereto through an electromagnetic valve 31.

The electronic control unit 35 receives signals from the pressure sensor 6a, the crank angle sensor 9, the charging pressure sensor 10a, the air flow sensor 11, the linear $O_2$ sensor 17, the lift sensor 26 of the exhaust gas recirculation valve 24, and an accelerator travel sensor 32 for detecting a travel of an accelerator pedal (not shown), respectively, and provides control signals by which the fuel injector 5, the high-pressure supply pump 8, the intake throttle valve 14, the exhaust gas recirculation valve 24, the variable vanes 21b of the turbocharger 25 are operated. While the fuel injector 5 is controlled to spray a controlled amount of fuel at a controlled timing in accordance with engine operation conditions, at the same time, control of the common rail pressure, i.e. the fuel injection pressure, is made by the high-pressure supply pump 8. In addition, control of the amount of intake air by the intake throttle valve 14, control of the amount of exhaust gas recirculation by the exhaust gas recirculation valve 24, and control of the variable vanes 21b of the turbocharger 25 are carried out. More specifically, a fuel injection control map that prescribes a basic amount of fuel injection which is empirically determined in appropriately accordance with changes in target engine output torque and engine speed and is electronically stored in a memory. Ordinarily, a basic amount of fuel injection Qbase is read from the fuel injection control map based on a target engine output torque which is determined in accordance with an output signal from the accelerator travel sensor 32 and an engine speed which is determined in accordance with an output signal from the crank angle sensor 9. On the basis of the basic amount of fuel injection Qbase and the common rail pressure that is detected by the pressure sensor 6a, a period of pulsing for which the fuel injector 5 remains open is determined. Through the basic fuel injection control, the diesel engine 1 is supplied with an amount of fuel injection meeting to a target engine output torque, so as to provide a mean combustion chamber air-to-fuel ratio on a lean side ($A/H \geq 18$).

The fuel injection control is characterized by that, when it is estimated that the NOx trapping substance has absorbed NOx more than a specified amount and declined in NOx absorbing capacity, while the control is made to cause a change to a near stoichiometraic air-to-fuel ratio, fuel injection is divided into two parts, namely primary fuel injection at a timing near to a top dead center of a compression stroke of the cylinder and post-fuel injection at a controlled timing within expansion and exhaust strokes of the cylinder after the primary fuel injection.

Figure 4A:
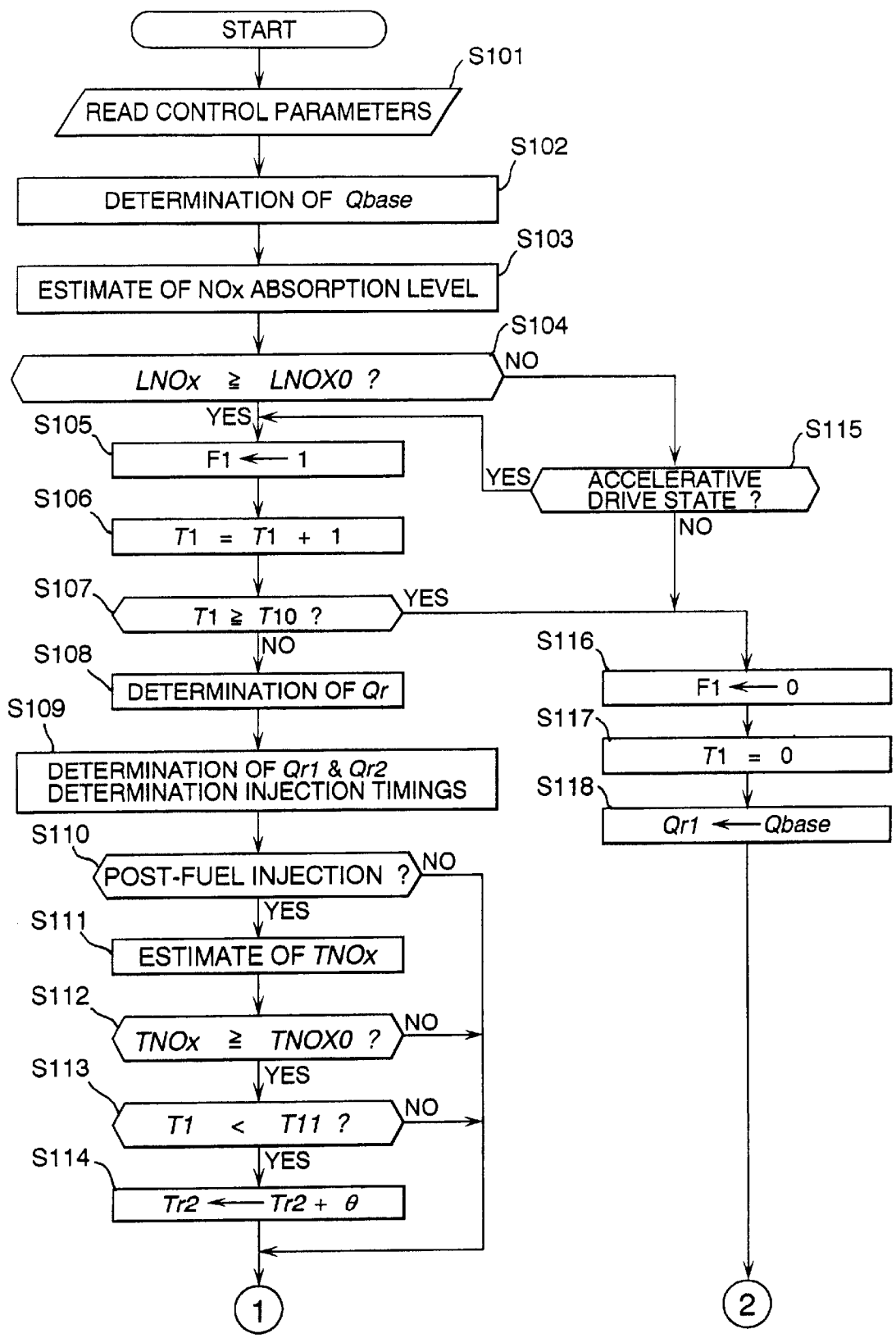
FIGS. 4A and 4B are respective parts of a flow chart illustrating a sequence routine of fuel injection control.
Figure 4B:
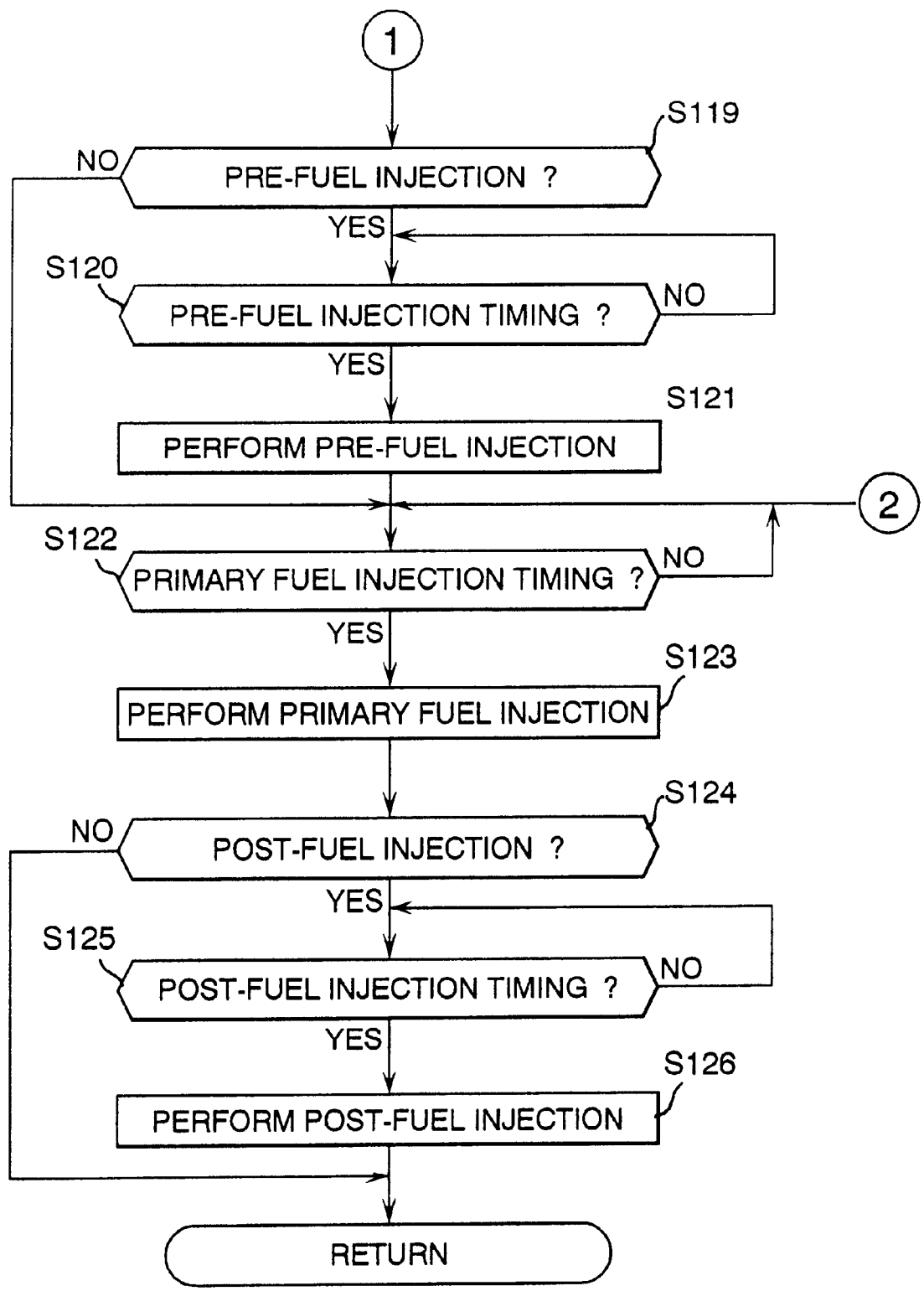
Figure 5:
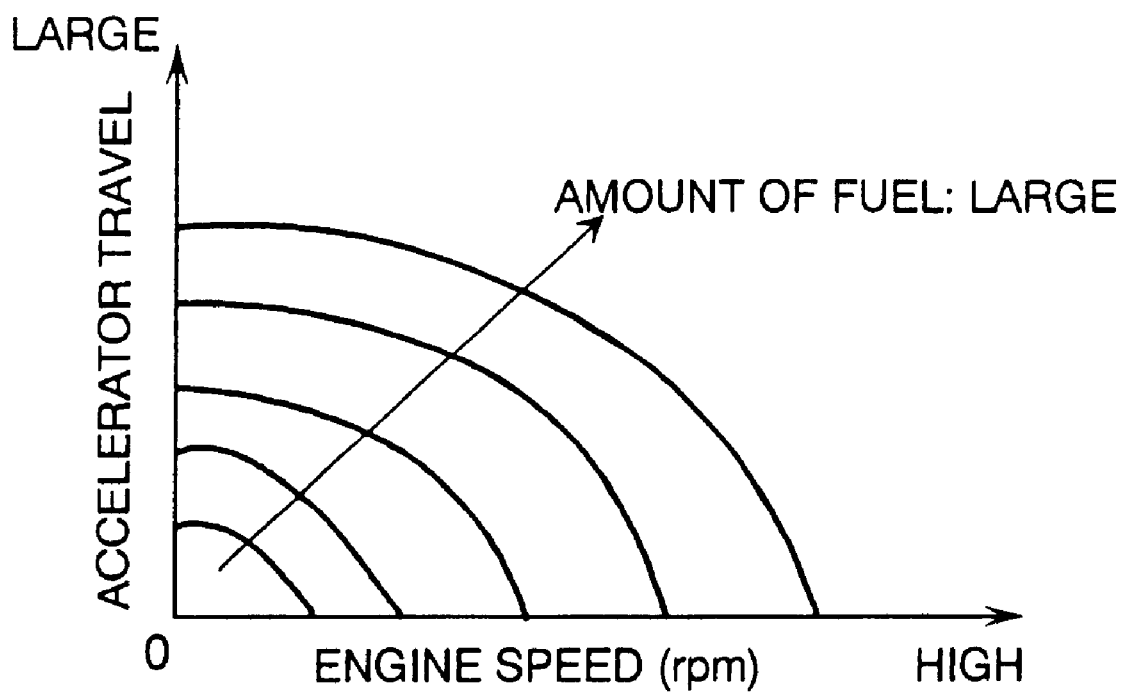
FIG. 5 is a control map of an amount of fuel injection with respect to accelerator travel and engine speed shown by way of example.

FIGS. 4A and 4B are respective parts of a flow chart illustrating a sequence routine of fuel injection control which is carried out every predetermined crank angle per cylinder 2. When the sequence logic commences and control proceeds to a block at step S101 where various control parameters represented by at least signals from the crank angle sensor 9, the air flow sensor 11, the $O_2$ sensor 17 and the accelerator travel sensor 32. Subsequently, a basic amount of fuel injection Qbase is determined with respect to a target engine output torque which is determined from the accelerator travel and an engine speed which is determined from the crank angle with reference to a fuel injection control map at step S102, In this instance, the fuel injection control map in which an optimum amount of fuel injection Q is empirically defined as a basic amount of fuel injection Qbase with respect to changes in accelerator travel and engine speed as exemplary shown in FIG. 5. In this map, the basic amount of fuel injection Qbase is defined so as to become larger with an increase in accelerator travel and with an increase in engine speed. Subsequent to an estimate of a level of NOx absorption LNOx of the NOx trapping substance of the catalyst 22 at step S103, a decision is made at step S 104 as to whether or not the estimated level of NOx absorption LNOx of the NOx trapping substance of the catalyst 22 has reached a specified level LNOx0. The estimate of a level of NOx absorption LNOx of the NOx trapping substance may be made on the basis of an integrated value of a total mileage of the vehicle and a total amount of fuel consumed for the total mileage or the an integrated value after correction according to engine operation condition. Otherwise, it may be acceptable to estimate it on the basis of a total hours of engine operation.

When the estimated level of NOx absorption LNOx is still below the specified level LNOx0, another decision is made as to whether a rate of change in accelerator travel per time $\Delta\alpha$ at step S115. When the estimated level of NOx absorption LNOx has reached or exceeded the specified level LNOx0 at step S104, or when a accelerator travel change $\Delta\alpha$ is greater than a specified change $\alpha 0$ at step S115, the amount of fuel injection is increased and sprayed through split fuel injection so as to refresh the NOx trapping substance. That is, a refresh flag F1 is set up to a state of "1" at step S105. The refresh flag F1 set up (F1=1) indicates that it is within a period of time for refreshing the NOx trapping substance of the catalyst 22 (a NOx trapping substance refresh period) by controlling an exhaust gas air-to-fuel ratio to become on a rich state around the stoichiometric air-to-fuel ratio so that the catalyst 22 releases NOx therefrom. Subsequently, after changing a timer count T1, which indicates progress of the NOx trapping substance refresh period by an increment of one (1) at step S106, a decision is made at step S107 as to whether or not the timer count T1 has reached a specified timer count T10. This specified timer count T10 corresponds to a time required to release NOx absorbed by the NOx trapping substance roughly entirely when the mean combustion chamber air-to-fuel ratio is controlled to reach a value near the stoichiometric air-to-fuel ratio. The specified timer count T10 may be corrected in accordance with engine operation conditions such as, for instance, a time for which the engine 1 is continuously operated with a lean fuel mixture and/or an engine load with which the engine 1 operates for the lean operation time.

Figure 6:
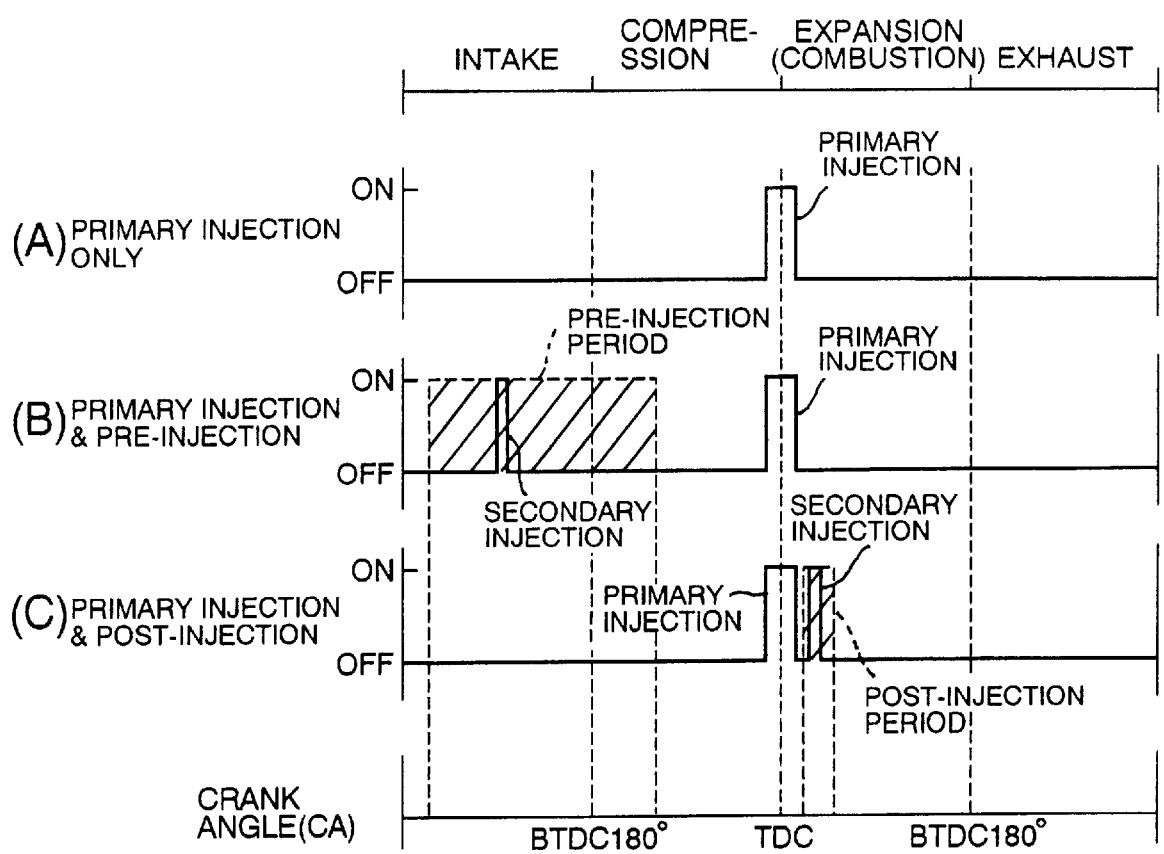
FIG. 6 is a time chart illustrating fuel injection timings at which pre-fuel injection, primary injection and post-fuel injection are made, respectively.

When the timer count T1 has not yet reached the specified timer count T10 at step S107, in other words, when it is still within the NOx trapping substance refresh period, the basic amount of fuel injection Qbase is increased to a corrected amount of fuel injection Qr so as to bring a mean combustion chamber air-to-fuel ratio to a value near the stoichiometric air-to-fuel ratio at step S108. Specifically, the corrected amount of fuel injection Qr is determined according to an amount of intake air that is detected by the air flow sensor 11 so that a mean combustion chamber air-to-fuel ratio attains a value near the stoichiometric air-to-fuel ratio while the amount of intake air is introduced into the combustion chamber. Thereafter, the corrected amount of fuel injection Qr is divided into two ports, an amount of fuel injection for the primary fuel injection (an amount of primary fuel injection) Qr1, an amount of fuel injection for the secondary fuel injection (an amount of secondary fuel injection) Qr2 and timings TQr1 and TQr2 for the primary and secondary fuel injection are determined at step S109. The primary and secondary fuel injection timings are specifically shown at (A) in FIGS. 6 by way of example. The timing TQr1 at which the fuel injector 5 opens to perform the primary fuel injection is advanced more from a standard timing which is 5° CA before a top dead center (BTDC 5° CA) as the amount of primary fuel injection Qr1 becomes greater and, to the contrary, retarded more from the standard timing as the amount of primary fuel injection Qr1 becomes smaller. Further, the timing TQr2 at which the fuel injector 5 opens to perform the secondary fuel injection is set within either a pre-fuel injection period which is between the beginning of intake stroke and a mid-point of time of an compression stroke (for example, between BTDC 350° CA and BTDC 90° CA) as shown at (B) in FIG. 6 or within a post-fuel injection period which is between an end of the primary fuel injection period and a mid-point of time of an expansion stroke (for example, between ATDC 15° CA and ATDC 25° CA, or between ATDC 10° CA and ATDC 25° CA if desirable) as shown at (C) in FIG. 5C. and is further advanced with an increase in engine load and, on the contrary, retarded with a decrease in engine load. In other words, the secondary fuel injection takes the form of pre-fuel injection that is caused earlier than the primary fuel injection while the engine 1 operates in the engine operation region of higher engine loads and, on the other hand, takes the form of post-fuel injection that is caused after the primary fuel injection while the engine 1 is in the engine operation region of lower engine loads. Moreover, a ratio of the amount of secondary fuel injection Qr2 relative to the amount of primary fuel injection Qr1 (which is referred to as a secondary-to-primary fuel injection ratio Qr2/Qr1) is empirically determined beforehand with respect to engine load and engine speed and electronically stored in the form of a map. When the secondary fuel injection takes the form of pre-fuel injection, the secondary-to-primary fuel injection ratio Qr2/Qr1 is in a range between 8% and 23%, and changed higher in that range with an increase in engine load. On the other hand, when the secondary fuel injection takes the form of post-fuel injection, the secondary-to-primary fuel injection ratio is in a range between 30% and 50%, and changed smaller with an increase in engine load in that range. Thus, when the level of NOx absorption of the NOx trapping substance reaches the specified level and it is assumed that the catalyst 22 encounters a decline in NOx absorbing capacity in consequence, a correction is made to increase the amount of fuel injection Q so as to deliver a near stoichiometric air-to-fuel ratio, thereby refreshing the NOx trapping substance. At the same time, the amount of fuel injection is divided into two portions—an amount of primary fuel injection Qr1 and an amount of secondary fuel injection Qr2 with the result of restraining generation of smoke. The frequency of fuel injection is not limited to two times, and the primary fuel injection may be further divided into a multiple number of shots. Further, pilot-fuel injection may be made right before implementation of the primary fuel injection.

Figure 7:
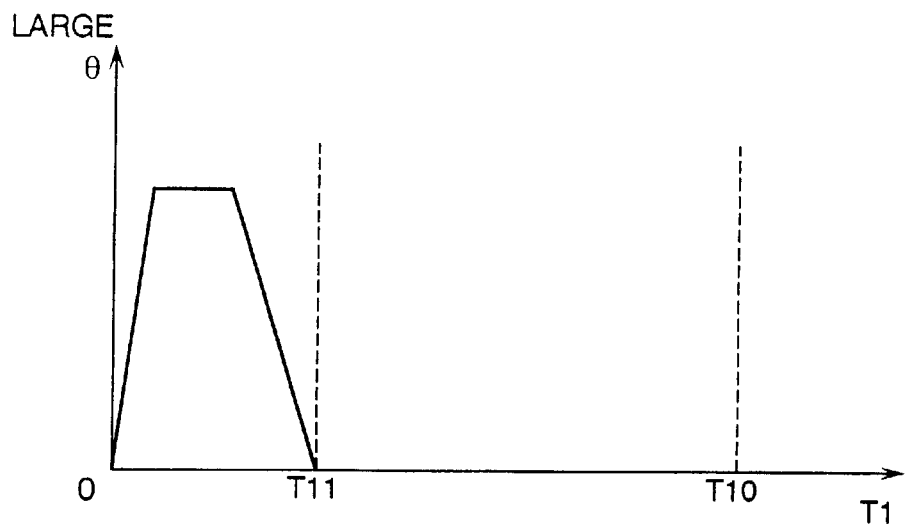
FIG. 7 is a diagram showing a change in correction value of retardation for pot-fuel injection timing with respect to time.

Following the determination of the amounts of primary and secondary fuel injection Qr1 and Qr2 and fuel injection timings Tr1 and Tr2 for the primary and secondary fuel injection at step S109, a decision is made at step S110 as to whether or not the post-fuel injection should be taken, i.e. whether or not the secondary fuel injection timing Tr2 is within the period of time for the post-fuel injection. When the secondary fuel injection timing Tr2 is within the period of time for the post-fuel injection, a temperature of the NOx trapping substance TNOx is estimated at step S111. The estimate of NOx trapping substance temperature TNOx is made with the intended to verify whether or not the NOx trapping substance has gained a temperature at which it releases NOx due to a drop in oxygen concentration and can be performed on the basis of a record of engine operation such as a total amount of fuel that has been consumed since an engine start, a record of traveling speed of the vehicle or a mileage. It may be accepted to provide a temperature sensor in the exhaust passage 20 for monitoring an NOx rapping substance temperature TNOx. Accordingly, a decision is subsequently made at step S112 as to whether or not the estimated NOx trapping substance temperature TNOx exceeds a specified temperature TNOx0. When the estimated NOx trapping substance temperature TNOx is higher than the specified temperature TNOx0, another decision is further made at step S113 as to whether the timer count T1 is still less than another specified timer count T11 which corresponds to an initial time of the NOx trapping substance refresh period in which the NOx trapping substance releases a large amount of NOx and is smaller than the specified time count T10. When the timer count T1 has reached the specified timer count T11, the fuel injection timings Tr2 for the secondary fuel injection Tr2 which is a post-fuel injection in this instance is corrected for retardation by an angle of $\theta$ at step S114. As shown in FIG. 7, the correction angle $\theta$ is different according to lapses of refresh time, namely timer counts T1. Specifically, the correction angle $\theta$ ascends sharply in an initial short period of time, remains constant for a middle period of time and descends to 0 (zero) at a rate smaller than a rate at which it ascends for a later period of time. The correction angle $\theta$ is set such that the post-fuel injection timing Tr2 is between 30° and 50° cam angle after a top dead center in the middle period of time. Although, in this embodiment, the correction angle $\theta$ changes with time, nevertheless, it may be constant over a period of time between 0 and T11.

When the secondary fuel injection timing Tr2 is out of the period of time for the post-fuel injection at step S110, when the estimated NOx trapping substance temperature TNOx is lower than the specified temperature TNOx0 at step S112, or when the timer count T1 exceeds the specified timer count T11 at step S113, the sequence logic proceeds to step S119 shown in FIG. 4B.

On the other hand, when an accelerator travel change $\Delta\alpha$ is less than the specified change $\alpha0$ at step S115, or when it is determined that the timer count T1 has reached the specified timer count T10 at step S107, after resetting up the refresh flag F1 at step S116 and the timer count T1 to zero (0) at step S117, the basic amount of fuel injection Qbase is employed as the amount of primary fuel injection Qr1 at step S118. Then, the sequence logic proceeds to step S122 shown in FIG. 4B.

That is, while the NOx trapping substance is at an estimated level of NOx absorption LNOx below the specified level LNOx0, the amount of fuel injection is not increased when the engine is not accelerative and sprayed through the primary fuel injection only as ordinary. As a result, the engine 1 operates with a mean combustion chamber air-to-fuel ratio on the lean side from the stoichiometric air-to-fuel ratio with an effect of improving fuel consumption during engine operation. On the other hand, when the engine 1 is in the accelerative state in which the engine 1 is required to provide high output, the amount of fuel injection is increased so as to provide an air-to-fuel ratio near the stoichiometric air-to-fuel ratio, thereby increasing engine output and refreshing the NOx trapping substance. Furthermore, when changing an air-to-fuel ratio during a transition of engine operating condition from an ordinary engine operating state to an accelerative engine operating state, because it is foreseeable for the driver that the change in air-to-fuel ratio is accompanied by fluctuation in engine output, the driver has nothing to spoil a feeling of drive.

Referring to FIG. 4B, when the sequence logic proceeds to step S119 where a decision is made as to whether or not it is expected to perform the pre-fuel injection. When it is expected to perform the post-fuel injection, then, another decision is made at step S120 as to whether or not it has reached the pre-fuel injection timing. After waiting until the pre-fuel injection timing is reached at step S120, the post-fuel injection is implemented at step S121. After implementation of the pre-fuel injection at step S123 or when it is not expected to perform the pre-fuel injection at step S119, a decision is subsequently made at step S122 as to whether or not it is the primary fuel injection timing. After waiting until the primary fuel injection timing is reached at step S122, the primary fuel injection is implemented at step S123. Subsequently, a decision is made at step S124 as to whether or not it is expected to perform the post-fuel injection. When it is expected to perform the post-fuel injection, then, another decision is further made at step S125 as to whether or not the post-fuel injection timing is reached. After waiting until the primary fuel injection timing is reached at step S125, the post-fuel injection is implemented at step S126. After implementation of the post-fuel injection at step S126 or when it is not expected to perform the post-fuel injection at step S124, the final step orders return for another cycle of the fuel injection control routine.

In the above embodiment, the respective steps of the sequence routine can be referred to as basic fuel injection amount determining means (step S102), NOx absorption level detection means (step S103), NOx absorption state judging means (step S104), refresh completion judging means (steps S105–S107), air-to-fuel ratio varying means or fuel amount increasing means (step S108), fuel injection judging condition determining means (step S109), NOx trapping substance temperature detecting means (step S111), NOx trapping temperature judging means (step S112), retardation period expiration judging means (step S113) for the post-fuel injection, fuel injection timing retarding means (step S114) for the post-fuel injection, accelerative operation detection means (step S115), and fuel injection control means (steps S109, S114 and S119 through S126). In particular, step S9 can be referred to as fuel injection timing and fuel injection ratio determining means for advancing a post-fuel injection timing more as an engine load becomes higher and decreasing the secondary-to-primary fuel injection ratio (Qr2 Qr1) more as an engine load becomes higher.

Figure 8:
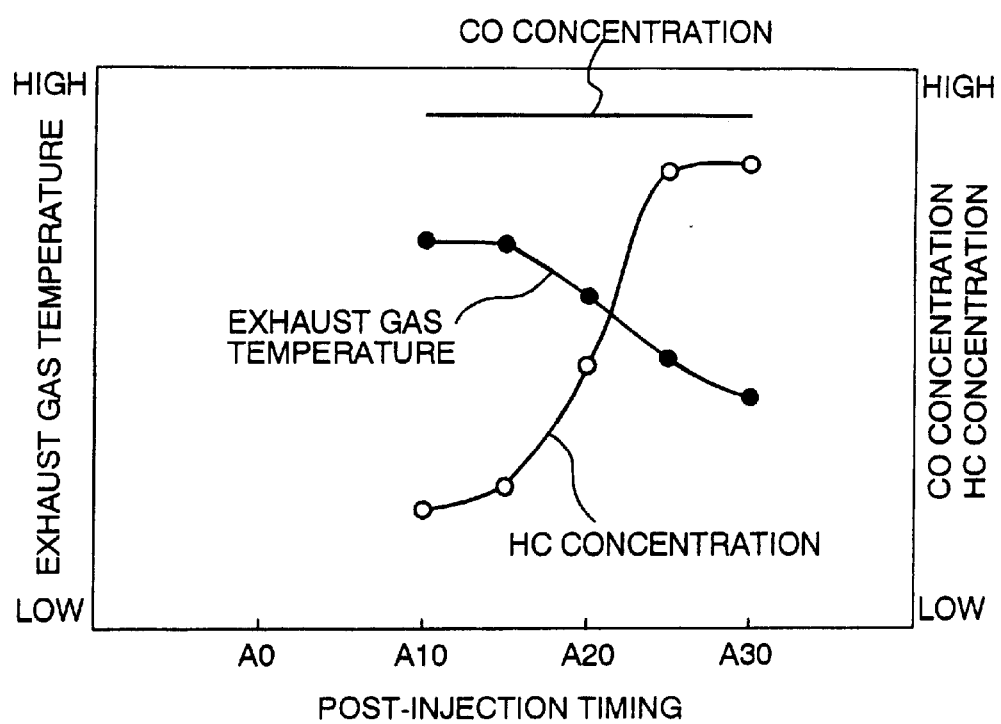
FIG. 8 is a diagram showing the relationship of emission levels of HC and CO and exhaust gas temperature with respect to retardation of post-fuel injection timing.

As apparent from the above embodiment, the engine control system of the invention increases the amount of fuel injection so as to change an mean combustion chamber air-to-fuel ratio to a value near the stoichiometric air-to-fuel ratio when the NOx trapping substance exceeds the specified level of NOx absorption or when the NOx trapping substance attains a temperature at which it releases NOx while the engine operates in the range of lower engine loads during acceleration and sprays the increased amount of fuel injection through the primary-fuel injection at a point of time near a top dead center of a compression stroke and post-fuel rejection subsequent to the primary-fuel rejection. Further, besides, since the post-fuel injection timing is retarded by a more-than-30° crank angle in the initial time (between 0 and T11) for refreshing the NOx trapping substance, the HC concentration of exhaust gas is raised not only by the change in air-to-fuel ratio raises but also by the retardation of post-fuel injection timing. As shown in FIG. 8 which shows the HC and CO concentrations of exhaust gas and the temperature of exhaust gas the before turbocharger 25 for variations in post-fuel injection timing Tr2 (which are expressed by an angle of retardation from a top dead center of a compression stroke) which are resulting from operation of a direct injection-spark ignition type of engine having a displacement of 2000 cc at 1500 rpm and a mean effective pressure Pe of 3, it is proved that the HC concentration of exhaust gas raises with an increase in angle of retardation of the post-fuel injection timing Tr2. Accordingly, in the initial period of releasing NOx from the NOx trapping substance where a largest amount of NOx is released, the CH concentration of exhaust gas raises due to a large angle of retardation of the post-fuel injection timing Tr2, as a result of which a deficiency of HC that is necessary to deoxidize and purify NOx released from the NOx trapping substance is worked off. Further, after a lapse of the initial time (between 0 and T11) for refreshing the NOx trapping substance, since, though the amount of NOx release, the angle of retardation of the post-fuel injection timing Tr2 also becomes smaller in that period of time, amounts of NOx and HC generation in an exhaust gas are balanced, so as to prevent HC from being emitted into the atmosphere at a high level without being oxidized. In this instance, feedback control may be implemented to change an angle of retardation of the post-fuel injection timing Tr2 so as to provide an amount of HC generation most suitable to deoxidization of NOx, detecting a NOx or a HC concentration of exhaust gas, a lapse of the initial time (between 0 and T11) for refreshing the NOx trapping substance, Further, as apparent from FIG. 8, though an amount of HC generation in exhaust gas greatly increases when the post-fuel injection timing Tr2 is retarded, nothing in CO concentration changes. In other words, a CO/HC concentration ratio (which refers to a ratio of CO concentration relative to HC concentration in exhaust gas) changes according to angles of retardation of the post-fuel injection timing Tr2. CO in an exhaust gas is replaced NOx absorbed in the NOx trapping substance, which promotes NOx release of the NOx trapping substance.

Accordingly, it is desirable to determine the angle of retardation of the post-fuel injection timing Tr2 after a lapse of the initial time (between 0 and T11) for refreshing the NOx trapping substance so as to provide a CO/HC concentration ratio greater than a specified value. Practically, a CO/HC concentration ratio higher than the specified value may be gained either by setting the angle of retardation at, for example, 20° in crank angle on the basis of experimental data such as shown in FIG. 8, or by feedback controlling the angle of retardation on the basis of a HC concentration or both HC and CO concentrations of exhaust gas that are detected by a HC concentration sensor and a CO concentration sensor, respectively. Retarding the post-fuel injection by the angle of retardation determined in such a way promotes NOx release from the NOx trapping substance and refreshes the NOx trapping substance early enough.

Figure 9:
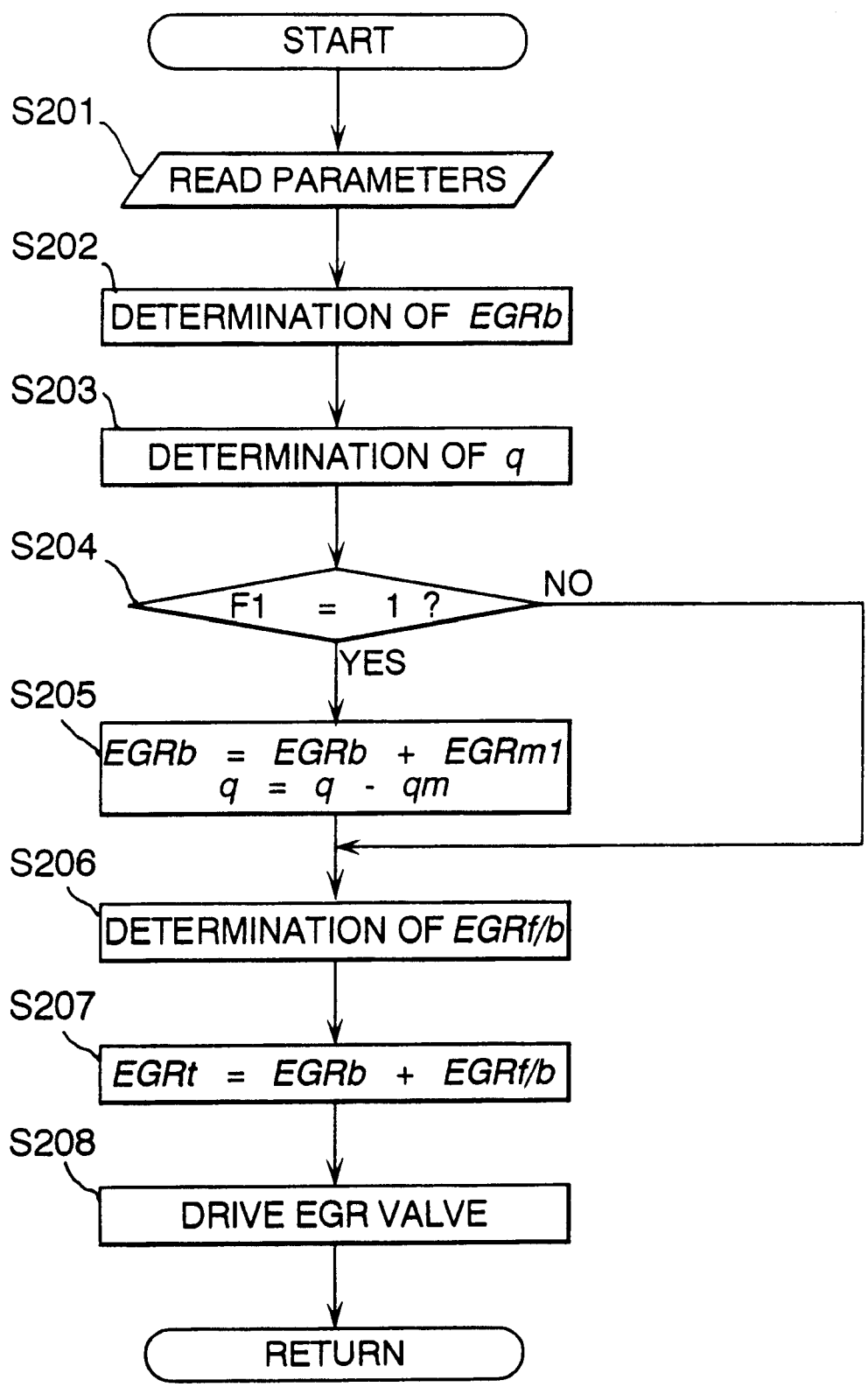
FIG. 9 is a flow chart illustrating a sequence routine of exhaust gas recirculation control.
Figure 10:
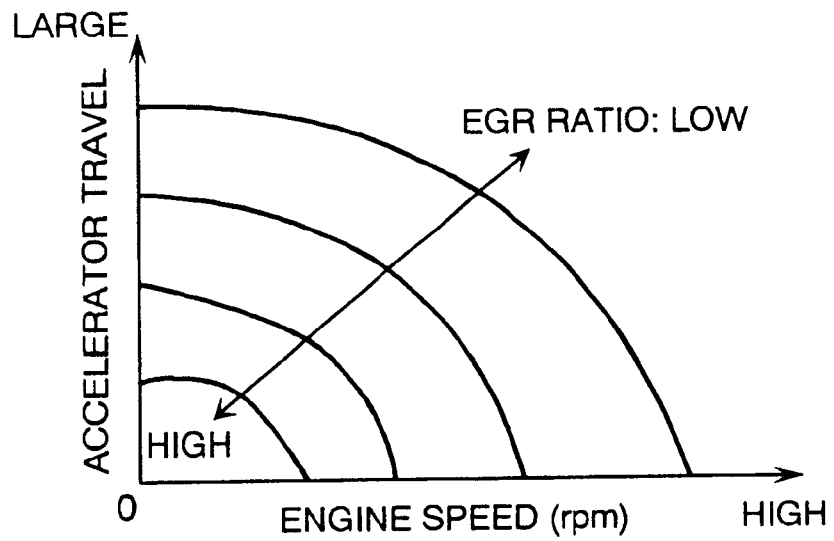
FIG. 10 is a control map of an exhaust gas recirculation ratio control map with respect to accelerator travel and engine speed shown by way of example.
Figure 11:
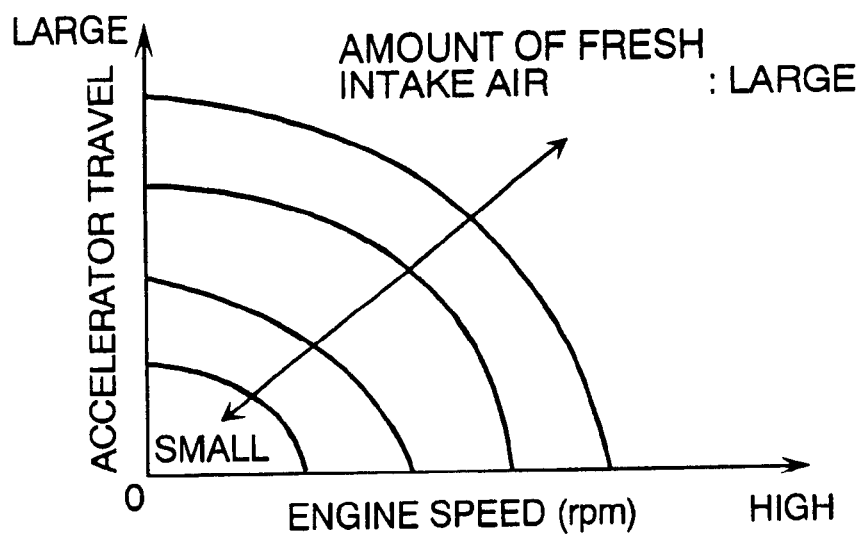
FIG. 11 is a control map of a target amount of fresh air with respect to accelerator travel and engine speed shown by way of example.
Figure 12:
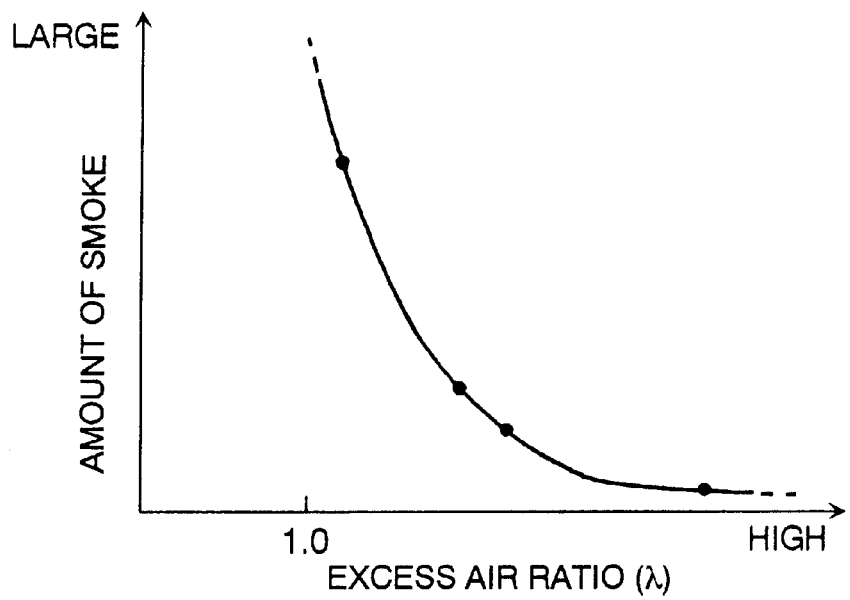
FIG. 12 is a diagram showing the relationship between an excess air ratio and an amount of smoke generation.

FIG. 9 is a flow chart illustrating a sequence routine of exhaust gas recirculation control by the electronic control unit (ECU) 35 which is periodically repeated. When the sequence logic commences, after reading signals representative of various control parameters including at least a crank angle, an air flow rate and an accelerator travel at step S201, a basic exhaust gas recirculation ratio EGRb is read from an exhaust gas recirculation control map in accordance with the accelerator pedal travel and an engine speed found from the crank angle at step S202. The exhaust gas recirculation control map, as shown in FIG. 10 by way of example, defines appropriate exhaust gas recirculation ratios that have been empirically determined with respect to accelerator pedal travel and engine speed and electronically stored in the memory of the electronic control unit 35. The basic exhaust gas recirculation ratio EGRb is defined so as to become basically larger with a decrease in accelerator pedal travel and/or a reduction in engine speed. The term "exhaust gas recirculation ratio" as used herein shall mean and refer to a ratio of an amount of exhaust gas that is recirculated relative to a total amount of air that is introduced into the combustion chamber. Subsequently, a target amount of fresh air q is read from a target fresh air amount control map in accordance with the accelerator pedal travel and the engine speed at step S203. The amount of fresh air refers to an amount of air, excluding an amount of exhaust gas recirculation, that is introduced into the combustion chamber 4 and detected by the air flow sensor 11. The target fresh air amount control map, as shown in FIG. 11 by way of example, defines appropriate amounts of fresh air that are empirically determined with respect to accelerator pedal travel and engine speed and electronically stored in the memory of the electronic control unit 35. The amount of fresh air q is defined so as to become larger with an increase in accelerator pedal travel and/or with an increase in engine speed. Also, generally, in a direct injection-spark ignition type of diesel engine, although generation of NOx can be restrained more effectively as the mean combustion chamber air-to-fuel ratio is lowered by increasing the amount of exhaust gas recirculation, however, to the contrary, as shown by way of example in FIG. 12, an amount of smoke generation increases sharply when the mean combustion chamber air-to-fuel ratio becomes too low. Therefore, the basic exhaust gas recirculation ratio EGRb and the target amount of fresh air q determined at steps S202 and S203, respectively, are set such as to keep the mean combustion chamber air-to-fuel ratio as small as possible within a range in which the amount of smoke generation increases sharply.

Subsequently, at step S204, a decision is made as to whether or not the refresh flag F1 is up. When the refresh flag F1 is up (F1=1), this indicates that it is within the NOx trapping substance refresh period, then, the basic exhaust gas recirculation ratio EGRb and the target amount of fresh air q are corrected, respectively, so as to lower the mean combustion chamber air-to-fuel ratio. Specifically, after determining a correction value EGRm corresponding to an engine load from an exhaust gas recirculation ratio correction value control map (not shown) for correcting for the basic exhaust gas recirculation ratio EGRb, and a correction value qm corresponding to the engine load from a fresh air amount correction value control map (not shown) for correcting for the target amount of fresh air q, the basic exhaust gas recirculation ratio EGRb is corrected by adding the exhaust gas recirculation ratio correction value EGRm thereto, and the the target amount of fresh air q is corrected by subtracting the fresh air amount correction value qm therefrom at step S205. The exhaust gas recirculation ratio correction value control map defines an exhaust gas recirculation ratio correction value EGRm with respect to engine loads that are empirically determined and electronically stored in the memory of the electronic control unit 35. The fresh air amount correction value control map defines a fresh air amount correction value qm with respect to engine loads that are empirically determined and electronically stored in the memory of the electronic control unit 35. Both correction values EGRm and qm are defined so as to become smaller with an increase in engine load. In this instance, the exhaust gas recirculation ratio correction value EGRm is determined such as to prevent an excessive increase in the amount of exhaust gas recirculation which possibly causes misfiring.

Figure 13:
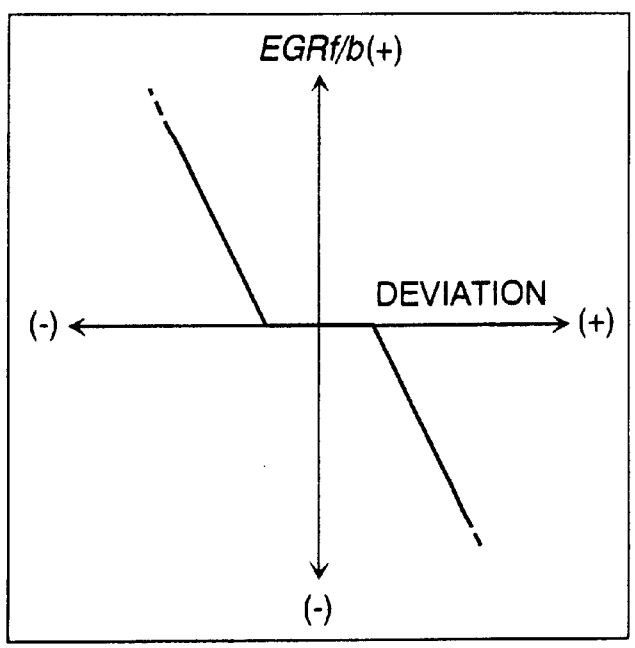
FIG. 13 is a control map of feedback control value with respect to deviation of the amount of fresh air.

Subsequent to the correction of the basic exhaust gas recirculation ratio EGRb and the target amount of air q at step S205, a feedback correction value of exhaust gas recirculation ratio EGRf/b that is used in exhaust gas recirculation feedback control is determined in accordance with a deviation of the amount of fresh air detected by the air flow censor 11 from the corrected target amount of fresh air q at step S206. The exhaust gas recirculation ratio feedback correction value EGRf/b is defined in an exhaust gas recirculation ratio feedback value control map such as shown by way of example in FIG. 13. In the exhaust gas recirculation ratio feedback value control map, the exhaust gas recirculation ratio correction values EGRf/b are empirically determined with respect to deviations between the practical amount of fresh air and the target amount of fresh air and electronically stored in the memory of the electronic control unit 35 so as to become smaller with an increase in deviation between the practical amount of fresh air and the target amount of fresh air when the target amount of fresh air is larger than the practical amount of fresh air, or to become larger with an increase in deviation between the practical amount of fresh air and the target amount of fresh air when the target amount of fresh air is smaller than the practical amount of fresh air. However, there is provided a dead zone at a section where the target amount of fresh air is close to the practical amount of fresh air.

At step S208, a target exhaust gas recirculation ratio EGRt is determined by adding the exhaust gas recirculation ratio correction value EGRf/b to the basic exhaust gas recirculation ratio EGRb. Subsequently, a control signal is output to energize the electromagnetic valve 28 to control the negative pressure, thereby driving the exhaust gas recirculation valve 24 according to the target exhaust gas recirculation ratio EGRt at step S208. Then, the final step orders return for another implementation of the exhaust gas recirculation control routine. In the exhaust gas recirculation control, the feedback control through steps S206 and S207 may be not always carried out.

The exhaust gas recirculation control system controls the exhaust gas recirculation valve 24 to open so as to bring the exhaust gas recirculation ratio larger while the refresh flag F1 remains up (F1=1), namely while it is within the NOx trapping substance refresh period than while the refresh flag remains down (F1=0) and to cause a decrease in the target amount of fresh air for compensation of a decrease in the amount of intake air due to the increase in the exhaust gas recirculation ratio. Since, as a result of the control, the mean combustion chamber air-to-fuel ratio lowers or changes to a value on the rich side, the combustion chamber air-to-fuel ratio is controlled to reach a value near the stoichiometric air-to-fuel ratio without increasing the amount of fuel injection so much through the fuel injection control. Further, an increase in engine output that is caused as a natural result of the increase in the amount of fuel injection is cancelled by a decrease in engine output that due to the decrease in the amount of intake air, which prevents or significantly reduces fluctuations in engine output in consequence. Although the exhaust gas recirculation ratio raises in the NOx trapping substance refreshing period, the angle of retardation of the post-fuel injection timing Tr2 is great in the initial time of the NOx trapping substance refresh period only and, however, made small with an effect of lowering an emission level of HC after a lapse of the initial time. Accordingly, a condition for recirculation of an exhaust gas containing a large amount of HC does not continue, and, in consequence, an increase in smoke and misfiring are prevented. The exhaust gas recirculation cause a fuel mixture to burn appropriately gentle with an effect of not only restricting NOx generation accompanying the combustion but also atomization and evaporation of fuel and promoting the mixing of fuel and air, so as the improve combustibility of the air-fuel mixture, as a result of which generation od smoke is restricted.

In the exhaust gas recirculation control sequence routine, steps 204 and S205 form what is referred to as exhaust gas recirculation means for controlling the exhaust gas recirculation valve 24 so as to cause a change in exhaust gas recirculation ratio greater when controlling a mean combustion chamber air-to-fuel ratio toward the stoichiometric air-to-fuel ratio than when controlling it toward a value on the lean side. The exhaust gas recirculation control may be done by performing feedback control so as to bring an exhaust gas air-to-fuel ratio represented by an output signal from a linear oxygen ($O_2$) sensor to a target air-to-fuel ratio.

The fuel injection control may be changed such that, in order to promote activation of the catalyst while a catalytic metal (noble metal) of the catalyst, such as not only a NOx trapping type of catalyst but also a three-way catalyst or a NOx reduction type of catalyst, for oxidizing HC is at a low temperature, fuel injection is divided into two parts, namely primary fuel injection which is implemented at a point of time near a top dead center of a compression stroke and post-fuel injection which is implemented after the primary fuel injection and the post-fuel injection is timed with a retardation from the top dead center of the compression stroke which is large for a specified period of time from commencement of the post-fuel injection and changed small after the specified period of time.

That is, in the fuel injection control routine shown in FIGS. 4A and 4B, the estimate of a temperature of the NOx trapping substance TNOx made at step S111 and the decision as to whether or not the estimated NOx trapping substance temperature TNOx exceeds a specified temperature TNOx0 made at step S112 may be replaced with an estimate of a temperature of the catalyst and a decision as to whether or not the estimated catalyst temperature exceeds a specified temperature, respectively. Specifically, a retardation of the post-fuel injection timing Tr2 is between crank angles of 15° and 20° after a top dead center when a catalyst temperature is higher than the specified temperature and, however, increased larger than, for example, a crank angle of 30° when a catalyst temperature is lower than the specified temperature. In this instance, the specified temperature is lower several tens of degrees than a temperature at which the catalyst shows a peak catalytic conversion efficiency. Accordingly, the catalyst is at low temperatures, the amount of HC generation in exhaust gas increases temporarily due to a large retardation of the post-fuel injection timing, so that oxidization of HC is made active on the catalyst with an effect of rising the temperature of the catalyst due to reaction heat. After the activity of the catalyst has been raised once, the catalyzing reaction progresses efficiently, the catalyst maintains its activity and, in consequence, lowers emission levels of HC and NOx efficiently even when the retardation is decreased after the raise in activity or even when the mode of fuel injection changes to the primary fuel injection only after completion of the post-fuel injection. Further, decreasing the retardation of the post-fuel injection timing causes a raise in exhaust gas temperature as shown in FIG. 8, so as to be advantageous to maintaining the catalytic activity.

Though the post-fuel injection is implemented in order to release NOx from the NOx catalyst in the above described embodiment, it may be implemented in order to raise the temperature of exhaust gas with an effect of promoting activation of the catalyst while the exhaust gas is at low temperatures. That is, when the temperature of exhaust gas is too low to achieve prompt activation of the catalyst through a raise in exhaust gas temperature due to implementation of the post-fuel injection with a small retardation, it is done to change the retardation greater temporarily so as to promote activation of the catalyst and subsequently smaller so as to increase the activity of the catalyst due to an increase in exhaust gas temperature.

It is to be understood that although the present invention has been described in detail with respect to the preferred embodiments thereof, various other embodiments and variants may occur to those skilled in the art, which are within the scope and spirit of the invention, and such other embodiments and variants are intended to be covered by the following claims.

What is claimed is:

1. A fuel injection control system for an internal combustion engine equipped with a fuel injector through which fuel is sprayed directly into a combustion chamber of the internal combustion engine and a catalyst disposed in an exhaust passage which contains a $NO_x$ trapping substance operative to absorb $NO_x$ in an exhaust gas containing oxygen in excess and to release $NO_x$ into the exhaust gas when the oxygen content of the exhaust gas lowers, said fuel injection control system comprising:

detecting means for detecting a value relating to an amount of $NO_x$ absorbed by said $NO_x$ trapping substance which represents a trapped amount of $NO_x$;

fuel injection control means for repeatedly performing fuel injection through primary fuel injection which is made at a primary fuel injection timing near a top dead center of a compression stroke when said trapped amount of $NO_x$ is larger than a specified amount and post-fuel injection at a post-fuel injection timing retarded by a predetermined time from said top dead center of compression stroke after said primary fuel injection when causing a fall in said oxygen concentration so as to release $NO_x$ from said $NO_x$ trapping substance;

wherein said control means controls a retardation of said post-fuel injection timing so as to be large for a specified period of time from a detection of said trapped amount of $NO_x$ larger than said specified amount than after a lapse of said specified period of time so as thereby to make an amount of HC in an exhaust gas from said combustion chamber larger for a period of time from said detection of said trapped amount of $NO_x$ larger than said specified amount to said lapse of said specified period of time than after said lapse of said specified period of time.

2. A fuel injection control system as defined in claim 1, wherein said retardation of said post-fuel injection timing in said specified period of time is greater than 30° in crank angle.

3. A fuel injection control system as defined in claim 1, wherein said retardation of said post-fuel injection timing after a lapse of said specified period of time is determined such that a concentration ratio a ratio of a CO concentration relative to a HC concentration of an exhaust gas becomes greater than a specified value for easy release of $NO_x$ from said $NO_x$ trapping substance.

4. A fuel injection control system as defined in claim 1, wherein said internal combustion engine is equipped with an exhaust gas recirculation system for admitting partly said exhaust gas into an intake air stream, and said control means determines said post-fuel injection timing after a lapse of said specified period of time so as to decrease said HC concentration of said exhaust gas while said exhaust gas recirculation system recirculates said exhaust gas.

5. A fuel injection control system for an internal combustion engine equipped with a fuel injector through which fuel is sprayed directly into a combustion chamber of the internal combustion engine and a catalyst disposed in an exhaust passage which contains a $NO_x$ trapping substance operative to absorb $NO_x$ in an exhaust gas containing oxygen in excess and to release $NO_x$ into the exhaust gas when the oxygen content of the exhaust gas lowers, said fuel injection control system comprising:

a controller configured to estimate a value relating to an amount of $NO_x$ absorbed by said $NO_x$ trapping substance which represents a trapped amount of $NO_x$; to perform fuel injection repeatedly through primary fuel injection which is made at a primary fuel injection timing near a top dead center of a compression stroke when said trapped amount of $NO_x$ is larger than a specified amount and post-fuel injection at a post-fuel injection timing retarded by a predetermined time from said top dead center of compression stroke after said primary fuel injection, and to control a retardation of said post-fuel injection timing so as to be large for a specified period of time from a detection of said trapped amount of $NO_x$ larger than said specified amount than after a lapse of said specified period of time so as thereby to make an amount of HC in an exhaust gas from said combustion chamber larger for a period of time from said detection of said trapped amount of $NO_x$ larger than said specified amount to said lapse of said specified period of time than after said lapse of said specified period of time.

* * * * *